US009491772B2

(12) United States Patent
Bruhn et al.

(10) Patent No.: US 9,491,772 B2
(45) Date of Patent: Nov. 8, 2016

(54) METHODS AND SYSTEMS FOR PLACESHIFTING DATA WITH INTERFERENCE MITIGATION

(71) Applicant: ECHOSTAR TECHNOLOGIES L.L.C., Englewood, CO (US)

(72) Inventors: Christopher William Bruhn, Aurora, CO (US); Phuc H. Nguyen, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 217 days.

(21) Appl. No.: 14/134,366

(22) Filed: Dec. 19, 2013

(65) Prior Publication Data
US 2015/0181484 A1    Jun. 25, 2015

(51) Int. Cl.
*H04W 72/04* (2009.01)
*H04W 4/00* (2009.01)
*H04W 72/08* (2009.01)

(52) U.S. Cl.
CPC .................................. *H04W 72/082* (2013.01)

(58) Field of Classification Search
CPC . H04L 1/0001; H04L 1/0003; H04L 1/0009; H04L 5/0053; H04L 5/0094; H04L 27/2608; H04W 72/04
USPC ......................................... 370/328, 338, 310
See application file for complete search history.

(56) References Cited

U.S. PATENT DOCUMENTS

| 7,826,337 | B2* | 11/2010 | Shi ..................... H04B 7/15585 370/201 |
| 9,072,107 | B2* | 6/2015 | Gauvreau ............. H04L 5/0053 |
| 2002/0150187 | A1* | 10/2002 | Chugg .............. H04L 25/03305 375/348 |
| 2003/0120809 | A1* | 6/2003 | Bellur ..................... H04L 45/02 709/239 |
| 2003/0128787 | A1* | 7/2003 | Terasawa ................. H04J 13/00 375/367 |
| 2004/0001530 | A1* | 1/2004 | Lyle ...................... H04B 1/715 375/132 |
| 2004/0032853 | A1* | 2/2004 | D'Amico .............. H04L 1/1893 370/349 |
| 2005/0013387 | A1* | 1/2005 | Ojard ..................... H04B 1/719 375/316 |
| 2005/0042999 | A1* | 2/2005 | Rappaport ............. H04B 1/719 455/307 |
| 2005/0141597 | A1* | 6/2005 | Sutskover ............ H04B 1/0475 375/146 |
| 2006/0121854 | A1* | 6/2006 | Abhishek .............. H04W 16/10 455/63.1 |
| 2006/0160536 | A1* | 7/2006 | Chou ....................... H04L 12/24 455/435.1 |
| 2006/0188003 | A1* | 8/2006 | Larsson ................. H04B 1/719 375/130 |
| 2008/0002611 | A1* | 1/2008 | Walker ................. H04L 12/1868 370/328 |
| 2009/0019165 | A1* | 1/2009 | Li .......................... H04L 1/0002 709/227 |
| 2010/0183090 | A1* | 7/2010 | Abbasfar ............ H04L 27/2614 375/296 |
| 2010/0309861 | A1* | 12/2010 | Gorokhov ............ H04B 1/7103 370/329 |

(Continued)

*Primary Examiner* — Wutchung Chu
(74) *Attorney, Agent, or Firm* — LK Global

(57) ABSTRACT

Methods and systems are provided for placeshifting data. An exemplary method of transmitting data from a source device to a destination device over a first communications channel involves identifying interference with transmission of the data from the source device to the destination device and initiating operation of a third device on a second communications channel after identifying the interference, wherein the operation of the third device is configured to mitigate the interference with the data transmission over the first communications channel.

17 Claims, 7 Drawing Sheets

(56) References Cited

U.S. PATENT DOCUMENTS

| | | | | |
|---|---|---|---|---|
| 2011/0055884 A1* | 3/2011 | Beattie, Jr. | ......... | H04N 21/2221 725/110 |
| 2011/0217985 A1* | 9/2011 | Gorokhov | ............. | H04W 24/10 455/452.2 |
| 2011/0258678 A1* | 10/2011 | Cowling | ............... | H04W 16/16 725/125 |
| 2012/0224481 A1* | 9/2012 | Babiarz | ............... | H04L 43/0876 370/230.1 |
| 2012/0274859 A1* | 11/2012 | Knutson | .................. | H04L 12/66 348/723 |
| 2013/0286903 A1* | 10/2013 | Khojastepour | ............ | H04L 5/14 370/280 |
| 2013/0301487 A1* | 11/2013 | Khandani | ............. | H04W 16/14 370/278 |
| 2014/0241168 A1* | 8/2014 | Merlin | ................ | H04L 43/0829 370/241 |
| 2014/0362897 A1* | 12/2014 | Gunasekara | ............ | H04L 1/206 375/227 |

\* cited by examiner

METHODS AND SYSTEMS FOR PLACESHIFTING DATA WITH INTERFERENCE MITIGATION

TECHNICAL FIELD

The following description generally relates to mitigating interference when transmitting data between different devices.

BACKGROUND

Performance advancements in wireless communications technology have resulted in a greater number of applications that leverage wireless communications for transmitting data, for example, in lieu of physical cables and/or wires. Due to the proliferation of wireless devices and/or wireless networks, wireless devices are often in relatively close proximity with other wireless devices that may be concurrently transmitting data on different wireless networks, which, in turn, may interfere with the ability of a wireless device to receive data. Accordingly, it is now desirable to create systems and methods for mitigating potential interference to provide a more satisfactory user experience. Other desirable features and characteristics may also become apparent from the subsequent detailed description and the appended claims, taken in conjunction with the accompanying drawings and this background section.

BRIEF SUMMARY

According to various exemplary embodiments, systems, devices and methods are provided for transmitting data from a source device to a destination device. One exemplary method involves identifying interference with transmission of data from the source device to the destination device over a first communications channel and initiating operation of a third device on a second communications channel after identifying the interference. The second communications channel is different from the first communications channel, and the operation of the third device is configured to mitigate the interference.

In other embodiments, a media system is provided. The media system includes a destination device to receive first data from a source device via a first communications channel and an auxiliary device communicatively coupled to at least one of the destination device or the source device to transmit second data over a second communications channel. The second data is configured to reduce interference with the destination device receiving the first data from the source device.

In another embodiment, a method involves transmitting data from a source device to a destination device via a first wireless communications channel, identifying interference with the transmitting of the data based at least in part on one or more performance metrics associated with the transmitting of the data, detecting communications on a second wireless communications channel after identifying the interference, and initiating operation of a third device on the second wireless communications channel after detecting the communications. The second wireless communications channel is different from the first wireless communications channel, and the third device is communicatively coupled to at least one of the source device and the destination device. The operation of the third device on the second wireless communications channel is configured to decrease a utilization ratio associated with the communications on the second wireless communications channel.

Various embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of a media system in accordance with one or more embodiments;

DETAILED DESCRIPTION

Figure 1:
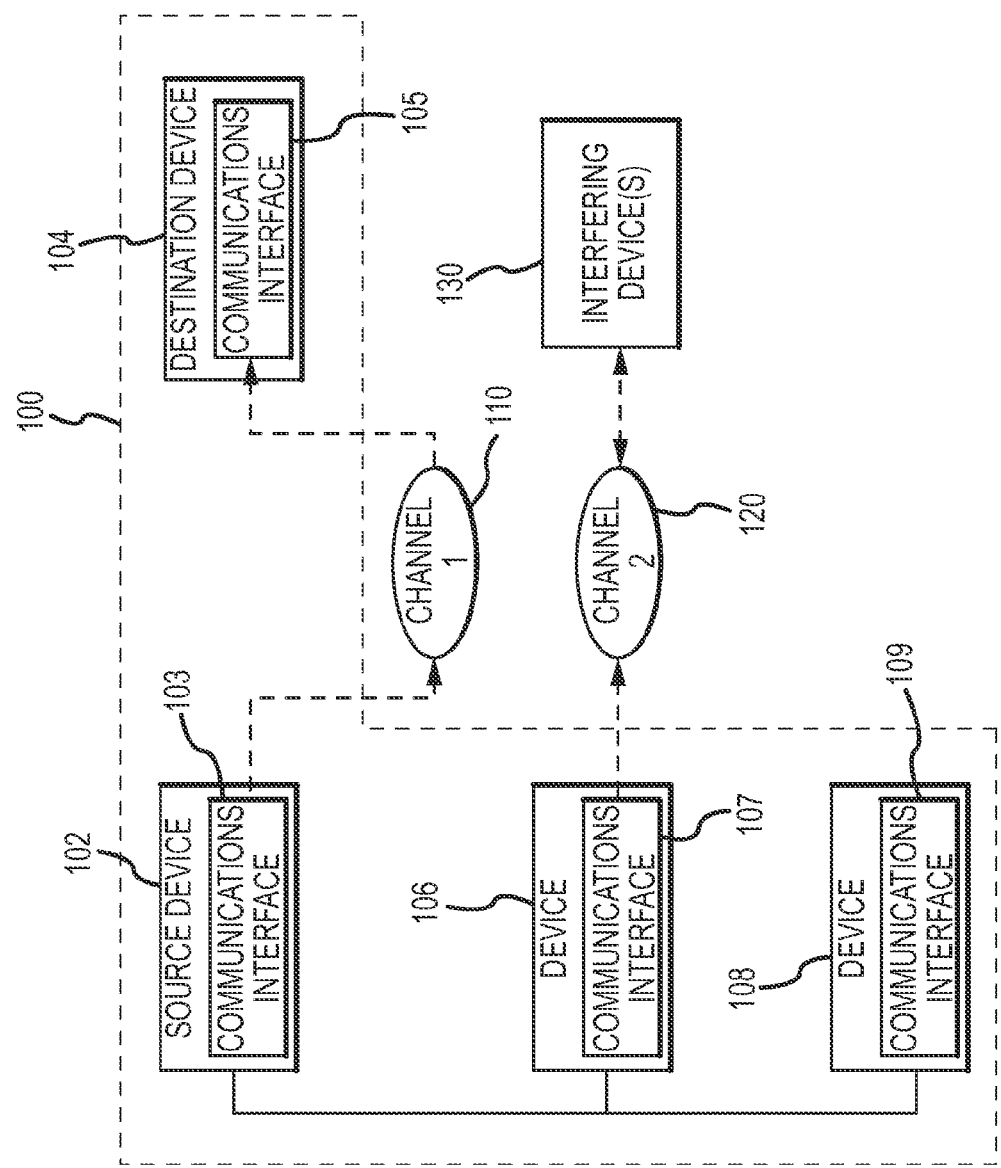

The following detailed description of the invention is merely exemplary in nature and is not intended to limit the invention or the application and uses of the invention. Furthermore, there is no intention to be bound by any theory presented in the preceding background or the following detailed description.

Embodiments of the subject matter described herein generally relate to reducing or otherwise mitigating interference when placeshifting or otherwise transmitting data between devices. In exemplary embodiments, when interference with the data transmission from one device (e.g., the "source" device) to another device (e.g., the "destination" device) is identified, a third device is operated in a manner that is configured to reduce or otherwise mitigate the interference with the data transmission. In this manner, the performance of the data transmission may be improved by mitigating the interference, thereby improving the user experience at the destination device for real-time placeshifting applications, such as, for example, streaming media content. Accordingly, for purpose of explanation but without limitation, the subject matter may be described herein in the context of placeshifting media content among devices within a media system. However, it will be appreciated that the subject matter described herein is not necessarily limited to any particular type of content for the data being placeshifted. As used herein, "media content," "media program," or variants thereof should be understood as referring to any audio, video, audio/visual or other programming in any streaming, file-based or other format.

As described in greater detail below, in exemplary embodiments, a peer-to-peer communication session is established between source and destination devices over a wireless communications channel, which is then utilized to wirelessly transmit the data corresponding to a particular media program from the source device to the destination device via the peer-to-peer communication session. After one of the source or destination devices identifies that the performance of the data transmission has been impaired, other wireless communications channels are monitored for potentially interfering communications. When potentially interfering communications are identified on another wireless communications channel, other devices within the media system that may be capable of mitigating the interference attributable to that wireless communications channel are identified. Thereafter, one or more of those potential mitigating devices are operated on that wireless communications channel in a manner that is intended to reduce or otherwise mitigate any interference with the data transmission between the source and destination device that would otherwise be attributable to communications on that wireless communications channel. For example, in exemplary embodiments, operation of a mitigating device is configured to reduce the amount, frequency and/or rate of communications by a potentially interfering device on that wireless communications channel.

FIG. 1 depicts an exemplary media system 100 configured to support placeshifting or otherwise transferring data, such as a media program (or media content), from a source electronic device 102 to a destination electronic device 104 via a first communications channel 110 while mitigating interference with the data transmission that is attributable to another electronic device 130 communicating on a second communications channel 120. For purposes of explanation, the subject matter is described herein in the context of the communications channels 110, 120 being realized as wireless communications channels; however, the subject matter described herein is not necessarily limited to wireless communications channels, and in alternative embodiments, one or both of the communications channels 110, 120 could be realized as a physical communications channel.

In exemplary embodiments, in addition to the source and destination devices 102, 104, the media system 100 also includes one or more additional electronic devices 106, 108, which may alternatively be referred to herein as auxiliary electronic devices 106, 108 for purposes of explanation. The electronic devices 102, 104, 106, 108 are communicatively coupled to one another, either directly or indirectly via another of the electronic devices 102, 104, 106, 108. At least one of the auxiliary devices 106, 108 is capable of concurrently transmitting data on the second communications channel 120 while source and destination devices 102, 104 are communicating on the first communications channel 110. As described in greater detail below, an auxiliary device 106, 108 concurrently transmits data on the second communications channel 120 in a manner that is configured to reduce or otherwise mitigate interference that would otherwise be attributable to the interfering device 130 communicating on the second communications channel 120. It should be appreciated that FIG. 1 is a simplified representation of the media system 100 for purposes of explanation and is not intended to limit the scope of the subject matter described herein in any way. In this regard, practical embodiments of the media system 100 may include any number of electronic devices that are communicatively coupled to one another to support the subject matter described herein.

As illustrated, each of the electronic devices 102, 104, 106, 108 within the media system 100 includes at least one communications interface 103, 105, 107, 109 that supports communications with at least one other electronic device 102, 104, 106, 108 within the media system 100. In this regard, the communications interface 103, 105, 107, 109 generally represents the component, hardware or the like of the respective electronic device 102, 104, 106, 108 that facilitates communications with a communications network capable of supporting transmission of data and/or information. Depending on the embodiment and the particular electronic device 102, 104, 106, 108 within the media system 100, the communications interface 103, 105, 107, 109 may include or otherwise be realized as a IEEE 802.11 wireless transceiver (e.g., "WiFi"), a Bluetooth transceiver, a cellular transceiver, a wired network interface controller (e.g., Ethernet), a coaxial transceiver interface, or the like. In this regard, the auxiliary devices 106, 108 may be communicatively coupled to at least one of the source device 102 or the destination device 104 via a physical communications channel (e.g., Ethernet, coaxial, or the like) and/or a wireless communications channel, which may be the same communications channel 110 as is used to transmit data from the source device 102 to the destination device 104.

In exemplary embodiments described herein, the communications interfaces 103, 105 of the source device 102 and the destination device 104 include a wireless communications interface configured to communicate over the same frequency band (or range), so that the source device 102 and the destination device 104 are capable of communicating with one another over a first wireless communications channel 110 within the frequency band. For example, both communications interfaces 103, 105 may be compliant with one or more of the IEEE 802.11 specifications and capable of communicating on the 2.4 GHz frequency band and/or the 5 GHz frequency band, wherein the first wireless communications channel 110 is realized as a discrete channel having a recognized center frequency within the 2.4 GHz frequency band. For example, the first wireless communications channel 110 may be realized as 802.11 channel 1, which is centered on 2.412 GHz with a channel width of 20 MHz.

In exemplary embodiments described herein, the second wireless communications channel 120 that the interfering device 130 communicates on is another discrete channel within the same frequency band as the first wireless communications channel 110, but the second wireless communications channel 120 is different from the first wireless communications channel 110. In this regard, the second wireless communications channel 120 may be realized as another 802.11 channel that that overlaps at least a portion of the first wireless communications channel 110. For example, if the first wireless communications channel 110 is realized as 802.11 channel 1, the second wireless communications channel 120 may be realized as one of 802.11 channel 2 through 802.11 channel 5. The subject matter described herein is not necessarily limited to the second wireless communications channel 120 being within the same frequency band as the first communications channel 110 and/or overlapping with the second wireless communications channel 120. That said, the likelihood of interference with the data transmission between devices 102, 104 is greatest when the second wireless communications channel 120 overlaps the first communications channel 110, and accordingly, for purposes of explanation, the second wireless communications channel 120 may be described herein in the context of being in the same frequency band as the first communications channel 110 and/or overlapping at least a portion of the first communications channel 110.

Still referring to FIG. 1, the communications interface 107, 109 of at least one of the auxiliary devices 106, 108 includes a wireless communications interface configured to communicate over the same frequency band (or range) as the first wireless communications channel 110 such that the respective auxiliary device 106, 108 is capable of being operated to mitigate potential interference on the second communications channel 120 within that frequency band. For example, the communications interface 107 of a first auxiliary device 106 may be compliant with the IEEE 802.11b specification and capable of communicating on the 2.4 GHz frequency band. As described in greater detail below in the context of FIGS. 2-5, after identifying potential interference with data transmission from the source device 102 to the destination device 104 via the first wireless communications channel 110 that is occurring on a second wireless communications channel 120, either the source device 102 or the destination device 104 initiates operation of the auxiliary device 106 on the second wireless communications channel 120. The operation of the auxiliary device 106 on the second wireless communications channel 120 is configured to reduce or otherwise mitigate the potential interference within the first wireless communications channel 110 that may be caused by one or more devices 130 communicating on the second wireless communications channel 120. For example, either the source device 102 or the destination device 104 may instruct the auxiliary device 106 to operate its communications interface 107 to transmit data over the second wireless communications channel 120 at a frequency (or rate) that is configured to reduce the utilization ratio of the interfering device(s) 130 on the second wireless communications channel 120, which, in turn, reduces the likelihood of the interfering device(s) 130 on the second wireless communications channel 120 interfering with the data transmission on the first wireless communications channel 110.

The electronic devices 102, 104, 106, 108 and the potential interfering device(s) 130 may be realized as any sort of electronic device capable of wirelessly communicating data, such as, for example, a mobile telephone, a laptop or notebook computer, a tablet computer, a desktop computer, a personal digital assistant, a video game player, a portable media player or another media playback device, an e-reader, a wireless router, a wireless access point, a smart TV, a set-top box, a television receiver, a satellite receiver, or the like. As described in greater detail below in the context of FIG. 6, in one or more exemplary embodiments, at least the source electronic device 102 is realized as a media device, a set-top box, a television and/or satellite receiver, or the like, that is capable of receiving broadcast media programs and/or other media programs from an external content source (which could also be one of the auxiliary devices 106, 108), and streaming, transmitting, or otherwise placeshifting data corresponding to a media program to the destination device 104 via the first wireless communications channel 110. In some embodiments, the source device 102 may employ a digital video recorder (DVR) feature and/or functionality, wherein the source device 102 streams, transmits, or otherwise placeshifts, to the destination device 104 via the first wireless communications channel 110, data stored or otherwise maintained on a data storage element of the source device 102 that corresponds to a previously recorded broadcast media program.

Figure 2:
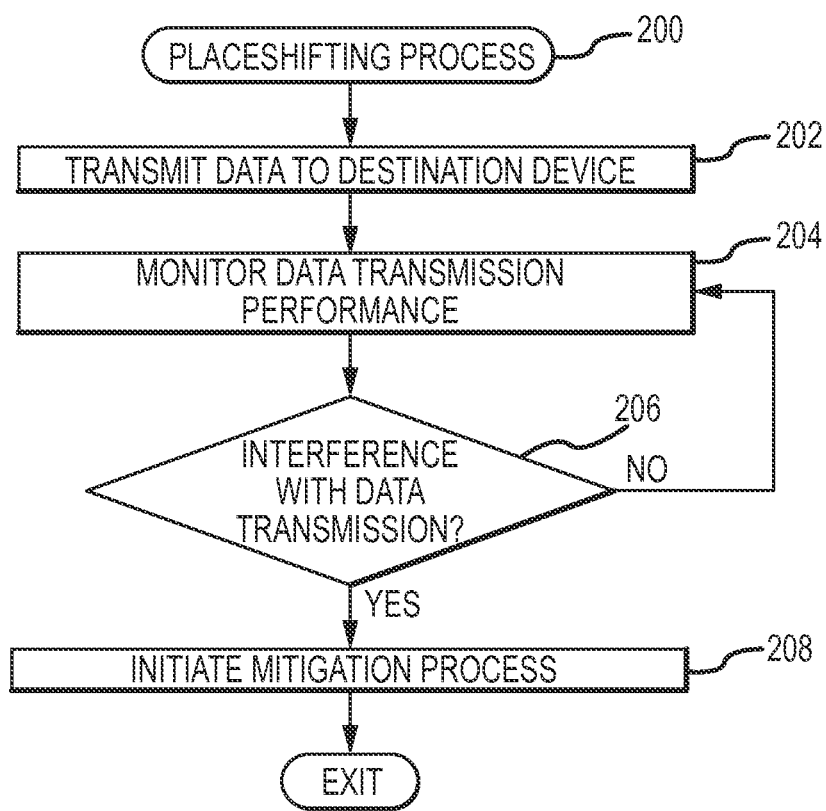
FIG. 2 is a flowchart of an exemplary placeshifting process suitable for use with the media system of FIG. 1 in accordance with one or more embodiments.

FIG. 2 depicts an exemplary embodiment of a placeshifting process 200 suitable for implementation by a media system, such as media system 100, to placeshift media content from a source device to a destination device. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the placeshifting process 200 may be performed by different elements of the media system 100, such as, for example, the source device 102, the destination device 104, or one or more auxiliary devices 106, 108. It should be appreciated that the placeshifting process 200 may include any number of additional or alternative tasks, the tasks need not be performed in the illustrated order and/or the tasks may be performed concurrently, and/or the placeshifting process 200 may be incorporated into a more comprehensive procedure or process having additional functionality not described in detail herein. Moreover, one or more of the tasks shown and described in the context of FIG. 2 could be omitted from a practical embodiment of the placeshifting process 200 as long as the intended overall functionality remains intact.

In exemplary embodiments, the placeshifting process 200 begins by transmitting or otherwise communicating data from a source device to a destination device via a communications channel (task 202). In this regard, a user of the destination device 104 or the source device 102 may interact with the respective device 102, 104 (e.g., by manipulating user input elements of the respective device 102, 104, a remote control device configured to interact with the respective device 102, 104, or the like) to indicate a desire to transmit a media program from the source device 102 to the destination device 104. For example, a user of the destination device 104 may manipulate a user input element (e.g., one or more buttons and/or keys, a touchscreen and/or touch panel, or the like) associated with the destination device 104 to indicate a desire to stream a media program from the source device 102. For example, a user may manipulate a remote control or other input device associated with the destination device to select, for streaming, a live broadcast media program that is capable of being received by the source device 102 in real-time or a previously-aired broadcast media program that is stored on the source device 102 or another remote content source coupled to the source device 102.

In response to receiving indication of the media program to be transmitted, the devices 102, 104 automatically establish a peer-to-peer communication session with one another via the first wireless communications channel 110, and the source device 102 automatically begins transferring the data corresponding to the selected media program to the destination device 104 via the peer-to-peer communication session over the first wireless communications channel 110. In this regard, the destination device 104 may be paired with the source device 102 upon initialization of the media system 100. In one or more embodiments, upon being powered on or otherwise enabled, the source device 102 and/or the destination device 104 detects or otherwise identifies the presence of the other device 102, 104 in its vicinity, for example, by performing a discovery procedure or otherwise scanning the first wireless communications channel 110 (or the range of frequencies of the frequency band including the first wireless communications channel 110) for other devices. In response to the devices 102, 104 discovering one another, the source device 102 obtains identification information for the destination device 104 and stores or otherwise maintains the identification information for the destination device 104, and similarly, the destination device 104 may obtain identification information for the source device 102 and store or otherwise maintain the identification information for the source device 102. The identification information may include an address of a respective device 102, 104 on the first wireless communications channel 110, a unique identifier associated with the communications interface 103, 105 of the respective device 102, 104 that is used to access the wireless communications channel 110 (e.g., a media access control address, or the like), a unique identifier associated with the respective device 102, 104 (e.g., a unique number assigned to the respective device 102, 104 by the media system 100, or the like), and/or model and/or versioning information for the respective device 102, 104, and the like (e.g., the type of electronic device, make and/or model of electronic device, firmware version, and the like). The devices 102, 104 may also exchange network authentication information from one another, such as, for example, secure sockets layer (SSL) keys, cryptographic keys, or the like.

Using the stored identification information and/or authentication information, the destination device 104 initiates the peer-to-peer communications session with the source device 102 in response to receiving selection of the media program to be placeshifted (or alternatively, the source device 102 initiates the peer-to-peer communications session using the stored identification information and/or authentication information for the destination device 104). After establishing the peer-to-peer communications session, the source device 102 automatically initiates transmission of the data corresponding to the selected media program to the destination device 104 via the peer-to-peer communications session over the first wireless communications channel 110.

After the data transmission to the destination device has begun, the placeshifting process 200 continues by monitoring the performance of the data transmission and detecting or otherwise identifying when the data transmission performance is indicative of potential interference on another communications channel (tasks 204, 206). In this regard, the source device 102 and/or the destination device 104 may calculate or otherwise determine the value for one or more performance metrics that quantify the relative quality or performance of the data transmission. The source device 102 and/or the destination device 104 monitors the performance metrics and detects or otherwise identifies when one or more of those performance metric values is indicative of the data transmission likely being impaired by interference, for example, by a respective performance metric value being greater than or less than a threshold value indicative of interference that should be mitigated.

During the data transmission, the source device 102 may track or otherwise monitor the number or frequency of buffer overruns, the throughput associated with the data transmission, the number or rate of acknowledgments received from the destination device 104, the modulation scheme or modulation rate associated with the data transmission, a packet error (or packet loss) rate associated with the data transmission, and the like, and detect or otherwise identify that the data transmission is impaired when one or more of those performance metrics exceeds one or more threshold values. For example, in one embodiment, the source device 102 may monitor the throughput of the data transmission and detect or otherwise identify impairment when the throughput of the data transmission falls below the data rate of the data being transmitted by a threshold percentage for a threshold duration of time and/or a threshold number of times. In this manner, the source device 102 may detect or otherwise identify potential interference on another communications channel when the performance of the data transmission interferes with the ability of the media program to be streamed to the destination device 104 without delays and/or interruptions in the presentation of the media program by the destination device 104. For example, if the data rate of the media program is 10 megabits per second (Mbps), the source device 102 may detect or otherwise identify potential interference when the bandwidth of the peer-to-peer communications session over the first wireless communications channel 110 falls below 10 Mbps for a threshold duration of time (e.g., 2 seconds or more) and/or a threshold number of times during a particular window of time (e.g., 2 or more times over a consecutive one minute interval).

Similarly, the destination device 104 may track or otherwise monitor the throughput associated with the data transmission, the modulation scheme or modulation rate associated with the data transmission, the packet error (or packet loss) rate associated with the data transmission, and the like, and detect or otherwise identify that the data transmission is impaired when one or more of those performance metrics exceeds one or more threshold values. For example, in one embodiment, the destination device 104 may monitor the packet error rate associated with the data transmission and detect or otherwise identify impairment when the packet error rate exceeds a threshold amount (e.g., a 10% packet error rate) and/or for a duration of time greater than a particular threshold amount of time and/or a threshold number of times during a particular window of time. In this manner, the destination device 104 may also detect or otherwise identify potential interference on another communications channel when the performance of the data transmission indicates potential interference that could impair the ability of the media program to be streamed by the destination device 104.

After determining the data transmission performance is indicative of potential interference on another communications channel, the placeshifting process 200 continues by initiating an interference mitigation process (task 208). In this manner, the placeshifting process 200 attempts to reduce or otherwise mitigate the impact of potential interference on the performance of the data transmission. In exemplary embodiments, the media system 100 implements or otherwise performs the mitigation process 300 described in greater detail below in the context of FIG. 3. As described in greater detail below, one or more of the auxiliary devices 106, 108 transmits data over the second wireless communications channel 120 as part of the mitigation process 300 in an attempt to reduce the utilization of the second wireless communications channel 120 by potentially interfering devices 130, and thereby, reduce the likelihood of those interfering devices 130 impairing the data transmission between the devices 102, 104 on the first wireless communications channel 110. In some embodiments, the auxiliary device 106 communicates on the second wireless communications channel 120 throughout the duration of the data transmission to allow the entirety of the data corresponding to the selected media program to be streamed to the destination device 104 with a reduced likelihood of interference. In other embodiments, the auxiliary device 106 communicates on the second wireless communications channel 120 only for a portion of the duration of the data transmission and then ceases transmitting data on the second wireless communications channel 120 when the operation by the auxiliary device 106 is ineffective or no longer desired. After the entirety of the selected media program has been transmitted to the destination device 104 or transmission of the selected media program is terminated, the placeshifting process 200 exits until transmission of another media program from one device 102, 104, 106, 108 to another device 102, 104, 106, 108 is reinitiated.

Figure 3:
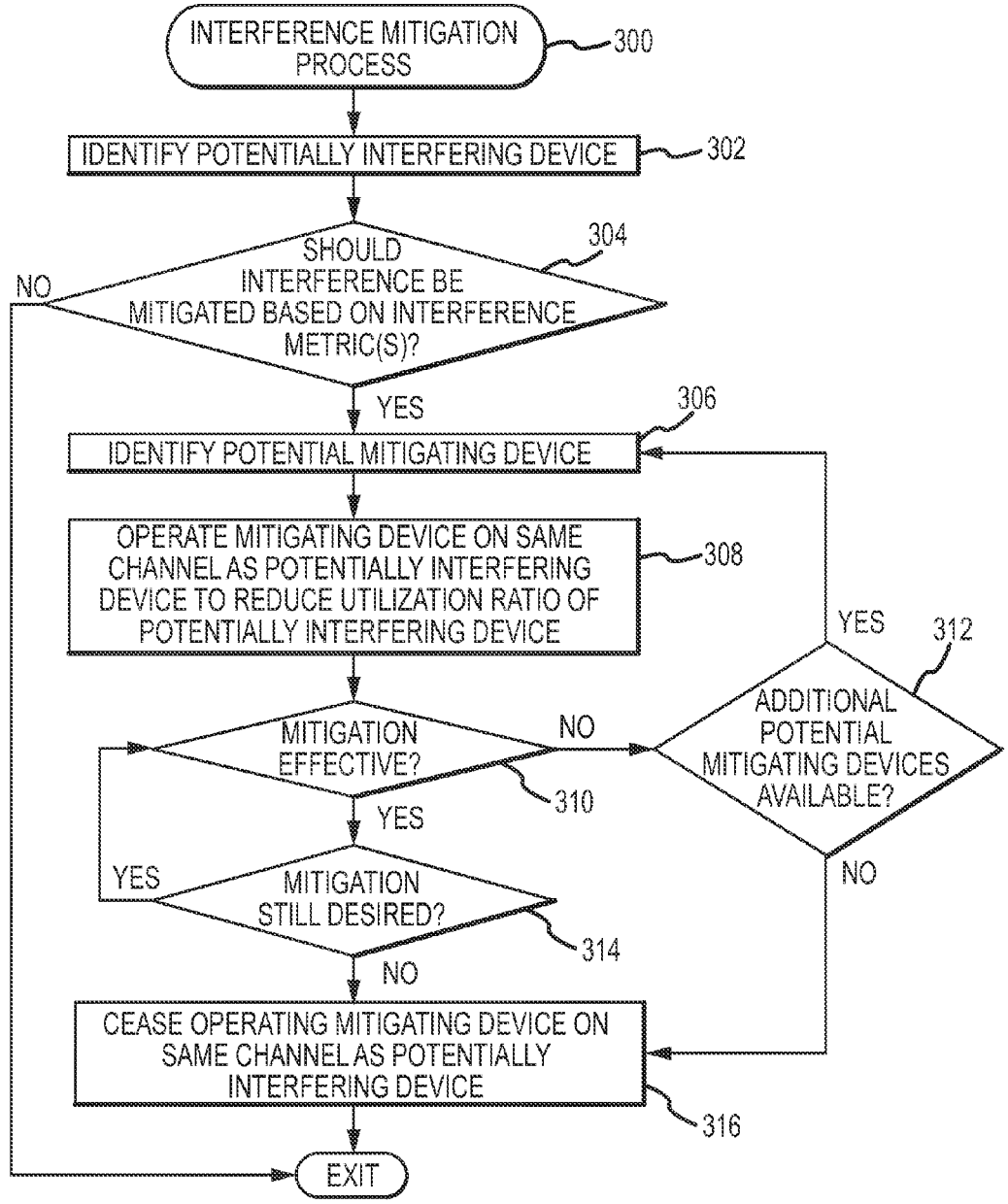
FIG. 3 is a flowchart of an exemplary interference mitigation process suitable for use in conjunction with the placeshifting process of FIG. 2 in the media system of FIG. 1 in accordance with one or more embodiments.

FIG. 3 depicts an exemplary embodiment of a mitigation process 300 suitable for implementation by a media system, such as media system 100, to mitigate interference when placeshifting media content from a source device to a destination device (e.g., task 208). The various tasks performed in connection with the illustrated process 300 may be implemented using hardware, firmware, software executed by processing circuitry, or any combination thereof. For illustrative purposes, the following description may refer to elements mentioned above in connection with FIG. 1. In practice, portions of the mitigation process 300 may be performed by different elements of the media system 100, such as, for example, the source device 102, the destination device 104, or one or more auxiliary devices 106, 108. It should be appreciated that the mitigation process 300 may include any number of additional or alternative tasks, the tasks need not be performed in the illustrated order and/or the tasks may be performed concurrently, and/or the mitigation process 300 may be incorporated into a more comprehensive procedure or process having additional functionality not described in detail herein. Moreover, one or more of the tasks shown and described in the context of FIG. 3 could be omitted from a practical embodiment of the mitigation process 300 as long as the intended overall functionality remains intact.

Referring to FIG. 3, and with continued reference to FIGS. 1-2, in exemplary embodiments, the mitigation process 300 is performed in response to detecting or otherwise identifying potential interference with data transmission from a source device to a destination device (e.g., task 208). The mitigation process 300 begins by detecting or otherwise identifying the presence of a potentially interfering device on a communications channel other than the communications channel utilized for the data transmission (task 302). In exemplary embodiments, in response to detecting potential interference that impairs the data transmission, the destination device 104 scans, monitors, or otherwise listens to one or more different wireless communications channels other than the wireless communications channel 110 being used for the data transmission for potentially interfering communications from one or more interfering device(s) 130. For example, when the wireless communications channel 110 is realized as an 802.11b channel (e.g., channel 1), the destination device 104 may automatically operate its communications interface 105 to scan the other 802.11b channels for communications on those channels by potentially interfering devices in the vicinity of the destination device 104. The destination device 104 may periodically and/or intermittently listen to the other wireless communications channels while receiving the data from the source device 102, for example, by alternating between monitoring or listening to the wireless communications channel 110 for new media content data and monitoring or listening to another wireless communications channel for other communications.

In some embodiments where the source device 102 detects the impaired data transmission performance, the source device 102 signals, commands, or otherwise instructs the destination device 104 (e.g., via the first wireless communications channel 110) to monitor the other wireless communications channels. In alternative embodiments, the source device 102 and/or the destination device 104 may identify an auxiliary device 106, 108 that is in the vicinity of the destination device 104 and command, signal, or otherwise instruct the identified auxiliary device 106, 108 to scan, monitor, or otherwise listen to the different wireless communications channels other than the wireless communications channel 110. For example, upon initialization of the media system 100, location information for the respective devices 102, 104, 106, 108 may be stored or otherwise maintained by one or more of the other devices 102, 104, 106, 108 in the media system 100 as part of pairing or otherwise establishing the association among devices 102, 104, 106, 108. In some embodiments, the destination device 104 maintains operation of its communications interface 105 on the wireless communications channel 110 and dedicates resources to receiving new media content data rather than monitoring or listening to other wireless communications channels for interference.

After detecting or otherwise identifying a potential interfering device on another communications channel, the mitigation process 300 continues by determining whether the potentially interfering device should be mitigated based on one or more interference metrics associated with the potentially interfering device (task 304). In exemplary embodiments, the device 104, 106, 108 in the media system 100 that detects communications on another communications channel calculates or otherwise determines one or more interference metrics associated with the detected communications and compares the interference metric(s) with one or more corresponding threshold value(s) to ensure that attempting to mitigate the potential interference is worthwhile. In this regard, in some embodiments, the mitigation process 300 may not attempt to mitigate the potentially interfering device when the interference metric(s) associated with the potentially interfering device indicate that the mitigation is unlikely to improve performance of the data transmission, for example, if the signal strength of the detected communications is too low, the frequency or rate of the detected communications is too low, etc. In other words, the mitigation process 300 may attempt to mitigate the potentially interfering device only when the interference metric(s) associated with the detected communications associated with that potentially interfering device indicate that the interference mitigation is likely to improve performance of the data transmission between the source and destination devices 102, 104.

For example, in one or more exemplary embodiments, in response to detecting communications on the second wireless communications channel 120, the destination device 104 (or alternatively, an auxiliary device 106, 108 in the vicinity of the destination device 104) monitors the second wireless communications channel 120 and calculates or otherwise determines a utilization ratio (or utilization rate) for the potentially interfering device 130 on the second wireless communications channel 120 based on the detected communications. As used herein, the utilization ratio should be understood as referring to the percentage of time during which a given device is transmitting data on a given communications channel. When the utilization ratio is greater than a threshold percentage, the destination device 104 (or the auxiliary device 106, 108 in its vicinity) determines that the potentially interfering device 130 should be mitigated. Conversely, when the utilization ratio is less than the threshold percentage, the destination device 104 (or the auxiliary device 106, 108 in its vicinity) determines that the potentially interfering device 130 should not be mitigated and the mitigation process 300 may exit or repeat the steps of detecting the presence of one or more additional potentially interfering devices and determining whether to attempt to mitigate those additional potentially interfering device(s)

(e.g., tasks 302, 304). For example, if the utilization ratio of the potentially interfering device 130 is less than 50%, the mitigation process 300 may determine that the potentially interfering device 130 should not be mitigated because further reducing the utilization ratio of the potentially interfering device 130 may not be sufficiently likely to improve the performance of the data transmission.

In another embodiment, in addition to or in alternative to determining the utilization ratio, the destination device 104 (or an auxiliary device 106, 108 in its vicinity) monitors the second wireless communications channel 120 and calculates or otherwise determines a signal strength for the potentially interfering device 130 on the second wireless communications channel 120 and compares the signal strength to a mitigation threshold signal strength. In this regard, when the received signal strength for communications from the potentially interfering device 130 is less than the mitigation threshold signal strength, the mitigation process 300 may determine that the further reducing the utilization ratio of the potentially interfering device 130 may not be sufficiently likely to improve the performance of the data transmission. Furthermore, in some embodiments, the mitigation process 300 may determine whether or not to attempt to mitigate the potentially interfering device 130 based on a combination of its utilization ratio and the received signal strength. In this regard, in practical embodiments, the mitigation process 300 may attempt to mitigate a relatively high utilization ratio at a relatively low signal strength while not attempting to mitigate a relatively low utilization ratio at that same relatively high signal strength, and similarly, the mitigation process 300 may attempt to mitigate a relatively low utilization ratio at a relatively high signal strength while not attempting to mitigate that relatively low utilization ratio at a lower signal strength. It should be appreciated that in practical embodiments, more complex schemes may be employed to determine whether or not to attempt to mitigate potential interference based on a numerous possible combinations of numerous different interference metrics, and accordingly, the subject matter described herein is not limited to any particular interference metric or any particular manner of determining whether or not to continue with the mitigation process 300.

Still referring to FIG. 3, in response to determining that mitigation of the potential interference should be attempted based on the interference metric(s) associated with the potential interference (e.g., the detected communications), the mitigation process 300 continues by identifying a potential mitigating device from among the auxiliary devices in the media system and operating the identified mitigating device on the same communications channel as the detected interference in a manner that is configured to reduce the utilization ratio of the potentially interfering device(s) on that communications channel (tasks 306, 308). In exemplary embodiments, the media system 100 implements or otherwise performs the mitigating device identification process 400 described in greater detail below in the context of FIG. 4 to identify a set of auxiliary devices 106, 108 in the media system 100 that may be utilized as a mitigating device. After identifying a set of potential mitigating devices, in one or more embodiments, the mitigation process 300 selects or otherwise identifies an auxiliary device from the set of potential mitigating devices that is most likely to be effective at mitigating the interference and/or improving the data transmission, such as, for example, the auxiliary device receives the communications from the interfering device 130 with the highest signal strength from among the set of potential mitigating devices. Thereafter, the mitigation process 300 signals, commands, or otherwise instructs the initially identified auxiliary device to operate its communications interface to transmit data over the second wireless communications channel 120 in a manner that is configured to reduce the utilization ratio of the interfering device 130 on the second wireless communications channel 120.

For example, in the illustrated embodiment of FIG. 1, the auxiliary devices 106, 108 may be identified as the set of potential mitigating devices by performing the identification process 400, and thereafter, when the received signal strength for communications from the interfering device 130 is higher for the first auxiliary device 106 relative to the second auxiliary device 108, the source device 102 and/or the destination device 104 may select or otherwise identify the first auxiliary device 106 as the initial mitigating device. Thereafter, the source device 102 and/or the destination device 104 signals, commands, or otherwise instructs the identified auxiliary device 106 to operate its communications interface 107 to transmit data over the second wireless communications channel 120 with a utilization ratio that is intended to result in the interfering device 130 reducing its utilization on the second wireless communications channel 120. For example, the source device 102 and/or the destination device 104 may signal the identified auxiliary device 106 to transmit dummy data over the second wireless communications channel 120 with a utilization ratio of about 50% or more. In this regard, in response to detecting the additional dummy data being transmitted on the second wireless communications channel 120, the potentially interfering device 130 may reduce its utilization ratio to accommodate the additional communications on the second wireless communications channel 120, thereby reducing the amount of interference on the data transmission between the source device 102 and the destination device 104 that would otherwise be attributable to the interfering device 130. For example, when the second wireless communications channel 120 is realized as an 802.11b channel and the devices 106, 130 are compliant with the 802.11b specification, the devices 106, 130 may implement or otherwise perform carrier sense multiple access with collision avoidance (CSMA/CA), request-to-send (RTS), and/or clear-to-send (CTS) mechanisms, which, in turn, results in the interfering device 130 reducing its utilization ratio.

Referring again to FIG. 3, in exemplary embodiments, the mitigation process 300 detects or otherwise determines whether the operation of the mitigating device is effective (task 310). When the attempted mitigation is not effective and another possible mitigating device is available, the mitigation process 300 selects or otherwise identifies another possible mitigating device from among the possible mitigating devices in the media system and operating the identified mitigating device in a similar manner as described above (tasks 306, 308, 310, 312). In this regard, operation of the initially identified mitigating device may be ineffective for one reason or another, in which case, another auxiliary device in the media system 100 may be chosen for the mitigation operation. For example, after signaling the first mitigating device 106 to transmit dummy data over the second wireless communications channel 120, the source device 102 may continue transmitting data to the destination device 104 and monitoring or otherwise tracking the performance of the data transmission over the first wireless communications channel 110. When the source device 102 fails to identify any improvement in the desired performance metric(s) of the data transmission to the destination device 104, the source device 102 may identify the second auxiliary device 108 as another possible mitigating device and thereafter signal, command, or otherwise instruct the second auxiliary device 108 to transmit dummy data over the second wireless communications channel 120 in a similar manner as described above. In some embodiments, the source device 102 may also signal, command, or otherwise instruct the first mitigating device 106 to cease transmitting dummy data over the second communications channel 120 while the second mitigating device 108 is transmitting dummy data over the second communications channel 120. In other embodiments, the first mitigating device 106 may continue transmitting dummy data over the second communications channel 120 concurrently with the second mitigating device 108.

In a similar manner as described above, after signaling the second mitigating device 108 to transmit dummy data over the second wireless communications channel 120, the source device 102 may continue transmitting data to the destination device 104 and monitoring or otherwise tracking the performance of the data transmission over the first wireless communications channel 110. In some embodiments, when the source device 102 fails to identify any improvement in the desired performance metric(s) of the data transmission to the destination device 104, the source device 102 may attempt to identify additional possible mitigating devices within the media system 100 (task 312). If no additional possible mitigating devices are available within the media system 100, the mitigation process 300 determines that the media system 100 is currently unable to mitigate the interference with the data transmission and achieve a desired transmission performance increase. In such situations, the mitigation process 300 signals, commands, or otherwise instructs the potential mitigating devices to cease operating on the same communications channel as the potentially interfering device (task 316) to avoid unnecessarily impacting performance of the potentially interfering device and exits.

Still referring to FIG. 3, in the illustrated embodiment, after operating an auxiliary device to mitigate interference on the data transmission between the source and destination devices, the mitigation process 300 continues by determining, detecting, or otherwise identifying whether the interference mitigation is still desirable and ceases or otherwise stops operation of the auxiliary device(s) to mitigate interference in response to determining the interference mitigation is no longer desirable (tasks 314, 316). In this manner, the mitigation process 300 allows the interfering device 130 to resume its previous utilization ratio once the interference mitigation is sufficient for the purposes of the data transmission between the source and destination devices 102, 104. For example, when the source device 102 is streaming a media program to the destination device 104, the source device 102 may automatically identify when the entirety of the media program has been transmitted, when the media program is over, when the destination device 104 is no longer presenting the media program to a user, or the like. Thereafter, the source device 102 may automatically signal or otherwise instruct the mitigating device 106 to cease transmitting data over the second communications channel 120. In yet other embodiments, prior to signaling the mitigating device 106 to transmit dummy data, the source device 102 may calculate or otherwise determine the remaining duration of the data (or media program) being transmitted to the destination device 104 and signal, command, or otherwise instruct the mitigating device 106 to transmit dummy data over the second wireless communications channel 120 only for that remaining duration. In this manner, the mitigating device 106 may automatically cease transmitting data over the second wireless communications channel 120 after that amount of time has elapsed and the data transmission over the first wireless communications channel 110 is likely to be complete.

In some embodiments, the source device 102 and/or the destination device 104 may continue monitoring one or more performance metric(s) associated with the data transmission and detect or otherwise identify that the interference mitigation is no longer necessary based on the performance metric(s). Thus, the source device 102 and/or the destination device 104 may stop the interference mitigation when it is determined that improvements to the performance metric(s) associated with the data transmission make it unlikely that the interference mitigation will be desirable for the remainder of the transmission. For example, source device 102 may calculate or otherwise determine the remaining duration of the data (or media program), and based on the remaining duration and the current transmission throughput, buffer status, or the like, the source device 102 may determine that it is likely that the remainder of the data transmission can be completed without buffering or interrupting the streaming media program, and thereafter instruct or otherwise command the mitigating device 106 to stop transmitting dummy data over the second wireless communications channel 120. In this manner, the overall impact on the operations of the interfering device 130 can be limited.

Still referring to FIG. 3, in some embodiments, a mitigating device 106 may dynamically adjust the utilization ratio and/or the transmission power associated with the dummy data based on the performance metric(s) associated with the data transmission between the source device 102 and/or the destination device 104. For example, the mitigating device 106 may initially transmit the dummy data at an initial utilization ratio and an initial transmission power, such as a maximum allowed utilization ratio (e.g., 90%) and/or a maximum allowed transmission power or some other combination of utilization ratio and transmission power that is sufficiently likely to reduce interference by the interfering device 130. When the source device 102 identifies improvement in the desired performance metric(s) of the data transmission to the destination device 104 (e.g., task 310), the source device 102 may signal, command, or otherwise instruct the mitigating device 106 to incrementally decrease the utilization ratio and/or the transmission power associated with the dummy data. As long as the performance metric(s) of the data transmission to the destination device 104 are maintained at the desired level(s), the source device 102 may continue signaling the mitigating device 106 to incrementally decrease the utilization ratio and/or the transmission power associated with the dummy data, to thereby limit its impact on the operations of the interfering device 130 and/or other devices on the second communications channel 120. Conversely, if the source device 102 identifies mitigation is no longer as effective as desired based on the performance metric(s) of the data transmission to the destination device 104, the source device 102 may signal, command, or otherwise instruct the mitigating device 106 to incrementally increase the utilization ratio and/or the transmission power associated with the dummy data. As long as the performance metric(s) of the data transmission to the destination device 104 not at the desired level(s), the source device 102 may continue signaling the mitigating device 106 to incrementally increase the utilization ratio and/or the transmission power associated with the dummy data. In this regard, in some embodiments of the mitigation process 300 prior to attempting to utilize another potential mitigating device when the initial attempted mitigation is not effective (e.g., task 312), the mitigation process 300 may signal or otherwise command the current mitigating device to increase the utilization ratio and/or the transmission power associated with the dummy data until determining that the current mitigating device is not capable of mitigating interference before identifying another potential mitigating device.

Figure 4:
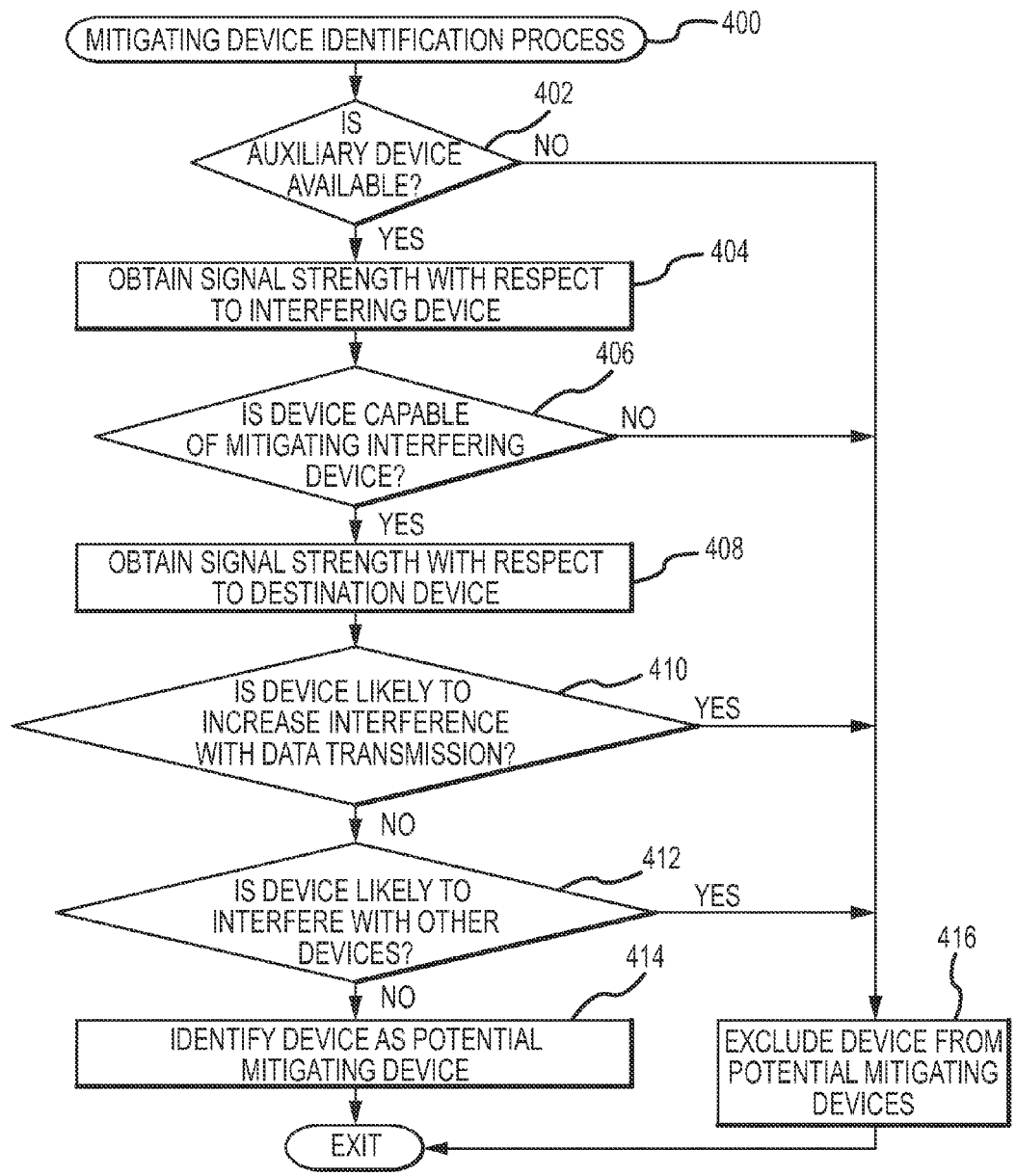
FIG. 4 is a flowchart of an exemplary mitigating device identification process 400 suitable for use in conjunction with the interference mitigation process of FIG. 3 in the media system of FIG. 1 in accordance with one or more embodiments.

FIG. 4 depicts an exemplary embodiment of a mitigating device identification process 400 suitable for implementation by a media system, such as media system 100, to identify a set of potential auxiliary devices that may be utilized to mitigate interference (e.g., task 306). The various tasks performed in connection with the illustrated process 400 may be implemented using hardware, firmware, software executed by processing circuitry, or any combination thereof. For illustrative purposes, the following description may refer to elements mentioned above in connection with FIG. 1. In practice, portions of the mitigation process 400 may be performed by different elements of the media system 100, such as, for example, the source device 102, the destination device 104, or one or more auxiliary devices 106, 108. It should be appreciated that the identification process 400 may include any number of additional or alternative tasks, the tasks need not be performed in the illustrated order and/or the tasks may be performed concurrently, and/or the identification process 400 may be incorporated into a more comprehensive procedure or process having additional functionality not described in detail herein. Moreover, one or more of the tasks shown and described in the context of FIG. 4 could be omitted from a practical embodiment of the identification process 400 as long as the intended overall functionality remains intact.

In exemplary embodiments, the identification process 400 begins by selecting or otherwise identifying an auxiliary device within the media system for evaluation and determining whether that auxiliary device is available to be operated to reduce the utilization ratio of the interfering device (task 402). In this regard, the identification process 400 determines whether the resources of a respective auxiliary device 106, 108 are currently preoccupied with transmitting data within the media system 100 or otherwise performing relatively higher priority functions that should not be disrupted for purposes of mitigating interference with the data transmission between source and destination devices 102, 104. When auxiliary device is unavailable, the identification process 400 removes or otherwise excludes the auxiliary device from the set of possible mitigating devices (task 416).

In exemplary embodiments, for each device 106, 108 within the media system 100 other than the source and destination devices 102, 104, the identification process 400 determines or otherwise identifies whether the communications interface 107, 109 of the respective auxiliary device 106, 108 is capable of being utilized to transmit mitigating data over the second wireless communications channel 120. For example, if the identification process 400 is being implemented by the source device 102, the source device 102 may poll or otherwise query each auxiliary device 106, 108 to ascertain whether the respective auxiliary device 106, 108 is currently utilizing its communications interface 107, 109 to transmit and/or receive data (e.g., to/from another device within the media system 100). When an auxiliary device 106, 108 is currently utilizing its communications interface 107, 109 for other data transmissions, the source device 102 excludes or otherwise removes the auxiliary device 106, 108 from the set of potential mitigating devices within the media system 100.

Additionally, in some embodiments, the identification process 400 determines or otherwise identifies whether processing resources of the respective auxiliary device 106, 108 are currently performing relatively higher priority functionality that should not be disrupted solely for purposes of mitigating interference with the data transmission between source and destination devices 102, 104. For example, the source device 102 may poll or otherwise query each auxiliary device 106, 108 to ascertain whether the respective auxiliary device 106, 108 is currently dedicating its processing resources to performing an operation that should not be slowed or otherwise disrupted by transmitting mitigating data over the second wireless communications channel 120, such as, for example, recording, transcoding, and/or presenting a media program. In this regard, to prevent degradation of the user experience of a user of a respective auxiliary device 106, 108, that respective auxiliary device 106, 108 may also be excluded from the set of potential mitigating devices within the media system 100 when it is currently performing an operation that is likely to be impaired, delayed, or otherwise disrupted by allocating processing resources to transmitting mitigating data over the second wireless communications channel 120.

In the illustrated embodiment, the identification process 400 continues by obtaining the received signal strength with respect to the interfering device for the auxiliary device being evaluated and identifying or otherwise determining whether the auxiliary device is capable of mitigating interference attributable to the interfering device (tasks 404, 406). In this regard, the identification process 400 ensures that the auxiliary device being evaluated is within communications range of the interfering device, such that the interfering device is capable of detecting, receiving or otherwise responding to transmissions by the auxiliary device. Conversely, the identification process 400 excludes or otherwise removes an auxiliary device from the set of potential mitigating devices when the signal strength between the auxiliary device and the interfering device is below a threshold value that indicates the auxiliary device is not within communications range of the interfering device or is otherwise unlikely to be capable of reducing the utilization ratio of the interfering device by a desired amount (task 416). For example, the threshold value for the interference signal strength may be chosen to be a minimum interference signal strength value (e.g., −88 dBm) at which operation of the auxiliary device to transmit mitigating dummy data is more likely than not to reduce the utilization ratio of the interfering device and/or increase performance of the data transmission between source and destination devices by a desired amount.

In exemplary embodiments, the source device 102 commands, signals, or otherwise instructs the other auxiliary devices 106, 108 within the media system 100 to operate their respective communications interfaces 107, 109 to monitor or otherwise listen to the second wireless communications channel 120 to verify or otherwise confirm they are in range of the potentially interfering device 130 and determine the respective received signal strength for communications from the potentially interfering device 130. When the interference signal strength between the interfering device 130 and a respective auxiliary device 106, 108 is less than a threshold value, the source device 102 and/or the identification process 400 may determine that operation of the respective auxiliary device 106, 108 to transmit mitigating data is unlikely to improve performance of the data transmission between source and destination devices 102, 104 and exclude the respective auxiliary device 106, 108 from the set of potential mitigating devices within the media system 100. In this manner, a respective auxiliary device 106, 108 may not be utilized by the mitigation process 300 when operation of that respective auxiliary device 106, 108 is unlikely to be worthwhile.

In the illustrated embodiment, the identification process 400 continues by obtaining the signal strength with respect to the destination device for the auxiliary device being evaluated and identifying or otherwise determining whether the auxiliary device is likely to increase interference with the data transmission between source and destination devices (tasks 408, 410). In this regard, the identification process 400 excludes or otherwise removes an auxiliary device from the set of potential mitigating devices when the signal strength between the auxiliary device and the destination device (alternatively, the destination signal strength) indicates that operation of the auxiliary device to transmit mitigating dummy data is likely to increase interference (or alternatively, fail to decrease interference by at least a desired threshold amount) with the data transmission between source and destination devices (task 416). In this manner, when the reduction in the utilization ratio of the interfering device 130 is likely to be offset by the increase in the utilization ratio of the auxiliary device 106, 108 being evaluated, or when the increase in the utilization ratio of the auxiliary device 106, 108 being evaluated is otherwise likely to increase interference with the data transmission between the source and destination devices 102, 104, the auxiliary device 106, 108 is excluded from the set of potential mitigating devices.

In exemplary embodiments, the identification process 400 excludes auxiliary devices having a signal strength at the destination device that is greater than or equal to the signal strength of the interfering device at the destination device. For example, if the signal strength of the auxiliary device 108 at the destination device 104 is greater than the signal strength of the interfering device 130 at the destination device 104, the auxiliary device 108 may be excluded from the set of potential mitigating devices within the media system 100 because operation of the auxiliary device 108 is likely to create more interference with destination device 104 than what was originally created by interfering device 130.

In one or more embodiments, the identification process 400 may also exclude auxiliary devices having a destination signal strength that is greater than or equal to a threshold value. In this regard, the threshold destination signal strength value may be chosen to be a value that indicates that the operation of the auxiliary device being evaluated is likely to interfere with the data transmission between the source and destination devices regardless of the interference signal strength between the destination device and the interfering device. For example, if the signal strength of the auxiliary device 108 at the destination device 104 is greater than −10 dBm, the auxiliary device 108 may be excluded from the set of potential mitigating devices within the media system 100 because operation of the auxiliary device 108 on the second wireless communications channel 120 is sufficiently likely to interfere with the data transmission between the source and destination devices 102, 104.

In some embodiments, the identification process 400 may also exclude auxiliary devices having a destination signal strength that is greater than or equal to the transmission signal strength of the source device at the destination device. For example, if the signal strength of the auxiliary device 108 at the destination device 104 is greater than the signal strength of the source device 102 at the destination device 104, the auxiliary device 108 may be excluded from the set of potential mitigating devices within the media system 100.

Still referring to FIG. 4, the illustrated identification process 400 continues by determining or otherwise identifying whether operation of the auxiliary device being evaluated is likely to interfere with other devices within the media system, and excluding or otherwise removing the auxiliary device from the set of potential mitigating devices when operation of the auxiliary device is likely to interfere with other devices within the media system (tasks 412, 416). In this manner, the identification process 400 identifies the auxiliary device being evaluated as a potential mitigating device when operating that auxiliary device is capable of mitigating the interference attributable to the interfering device without substantially interfering with the data transmission between source and destination devices or data transmissions by other devices within the media system (task 414). For example, if the auxiliary device 108 is located near another device within the media system 100 that is also transmitting data over the first wireless communications channel 110, the identification process 400 may exclude the auxiliary device 108 from the set of potential mitigating devices based on the signal strength between the auxiliary device 108 and that other device exceeding a threshold value or based on the distance between the auxiliary device 108 and the other device being less than a threshold distance. In this regard, upon initialization of the media system 100, location information for the various devices 102, 104, 106, 108 may be established and stored or otherwise maintained within the media system 100 (e.g., by the respective device 102, 104, 106, 108 implementing the identification process 400) and utilized to detect or otherwise identify when a respective auxiliary device 106, 108 is within a threshold distance of another device that may be actively transmitting data on the first wireless communications channel 110.

Referring to FIGS. 1-4, after performing the identification process 400, in exemplary embodiments, the mitigation process 300 selects or otherwise identifies an auxiliary device from among the set of potential mitigating devices within the media system 100, operates the selected auxiliary device on the second wireless communications channel 120 in a manner that is configured to reduce the utilization ratio of the interfering device 130 on the second wireless communications channel 120, and selects or otherwise identifies another auxiliary device from among the set of possible mitigating devices when the operation of the previously selected auxiliary device was not effective (tasks 306, 308, 310, 312). Thus, the mitigation process 300 may test, try, or otherwise cycle through each of the auxiliary devices in the set of possible mitigating devices identified by the identification process 400 until an effective auxiliary device is selected or all of the auxiliary devices in the set of possible mitigating devices have been tested. For example, the identification process 400 may identifies auxiliary devices 106, 108 as potential mitigating devices in the media system 100 that are available and capable of mitigating interference without increasing interference with the data transmission between source and destination devices 102, 104 and without interfering with other devices within the media system 100. Thereafter, the mitigation process 300 may select or otherwise identify the auxiliary device 106, 108 having the greatest interference signal strength with respect to the interfering device 130 as an initial mitigating device. For example, if the interference signal strength between the auxiliary device 108 and the interfering device 130 is −50 dBm and the interference signal strength between the auxiliary device 106 and the interfering device 130 is −60 dBm, the source device 102 may select auxiliary device 108 as the initial mitigating device and signal or otherwise instruct the auxiliary device 108 to transmit mitigating dummy data over the second wireless communications channel 120.

Thereafter, if the source device 102 determines that the operation of the auxiliary device 108 is not resulting in the desired amount of improvement to the performance metric(s) of the data transmission with the destination device 104, the source device 102 may signal or otherwise instruct the auxiliary device 108 to cease transmit mitigating dummy data over the second wireless communications channel 120 and select or otherwise identify auxiliary device 106 as the next mitigating device. Again, the source device 102 may signal or otherwise instruct the auxiliary device 106 to transmit mitigating dummy data over the second wireless communications channel 120, and similarly, if the source device 102 determines that the operation of the auxiliary device 106 is not resulting in the desired amount of improvement to the data transmission performance, the source device 102 may signal or otherwise instruct the auxiliary device 106 to cease transmitting mitigating dummy data. Otherwise, when the operation of the auxiliary device 106 achieves the desired amount of improvement to the data transmission performance, the auxiliary device 106 continues to transmit mitigating dummy data until the data transmission between the source device 102 and the destination device 104 is completed or otherwise improved to a level where the interference mitigation is no longer desired or otherwise needed.

Figure 5:
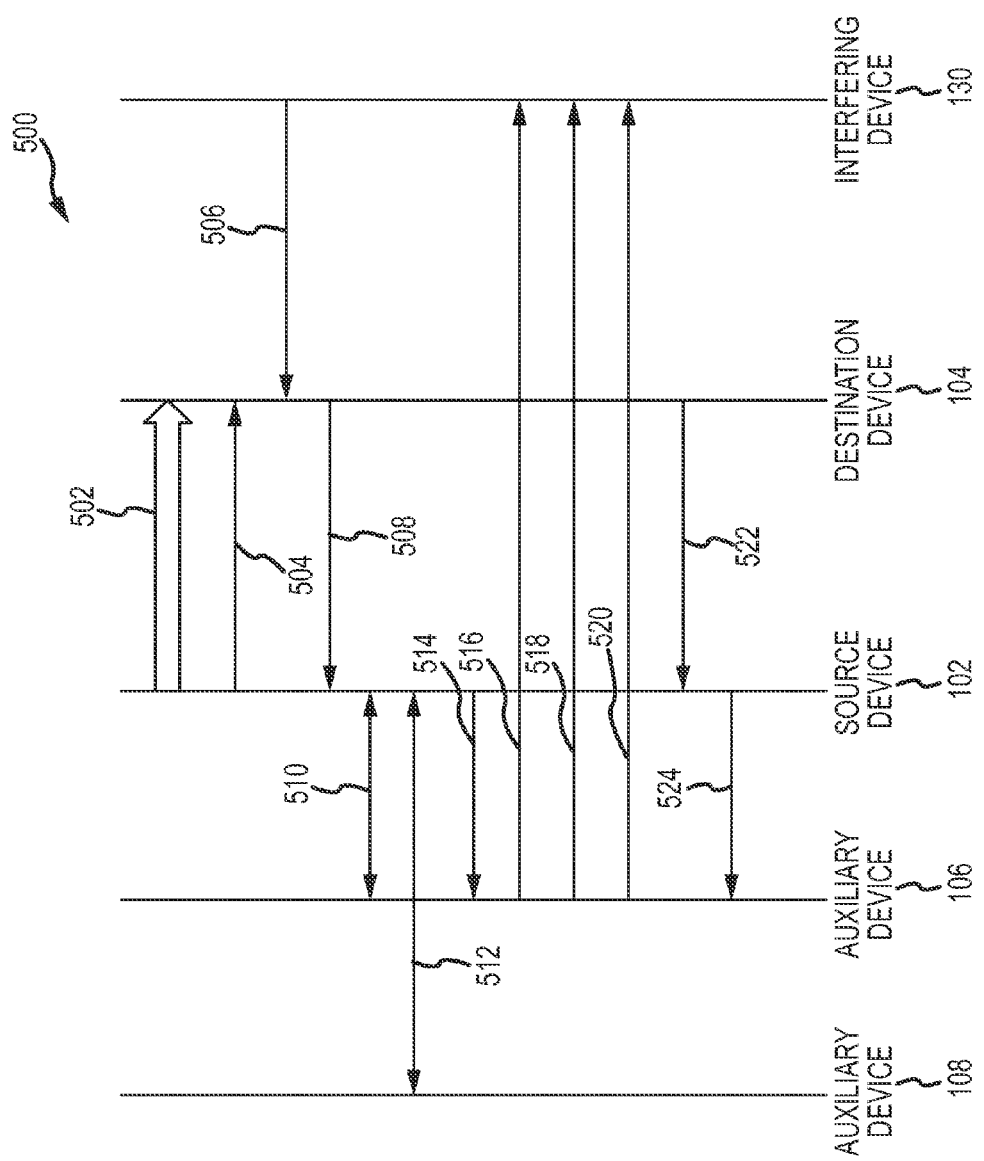
FIG. 5 is a diagram illustrating a sequence of communications within the media system of FIG. 1 in accordance with one exemplary embodiment of the placeshifting process of FIG. 2.

FIG. 5 depicts an exemplary sequence 500 of communications within the media system 100 of FIG. 1 in accordance with an exemplary embodiment of the processes 200, 300, 400 described above in the context of FIGS. 2-4. As described above in the context of the placeshifting process 200 of FIG. 2, the sequence 500 begins with the source device 102 transmitting 502 data to the destination device 104 via a peer-to-peer communications session on the first wireless communications channel 110 (e.g., task 202). For example, a user may manipulate or otherwise interact with the destination device 104 to identify or otherwise input a media program available via the source device 102 that the user would like to placeshift to the destination device 104 (e.g., to stream the media program via the destination device 104, store the media program on the destination device 104, or the like). Thereafter, the destination device 104 communicates with the source device 102 over the first wireless communications channel 110 to establish the peer-to-peer communications session and initiate the data transmission 502 corresponding to the selected media program.

In the illustrated embodiment, during the data transmission 502, the source device 102 monitors the transmission performance (e.g., task 204) and detects or otherwise identifies interference with the transmission performance that should be mitigated (e.g., task 206). After identifying a transmission performance impairment that is likely attributable to interference that should be mitigated, the source device 102 initiates the mitigation process 300 (e.g., task 208) by signaling or otherwise instructing 504 the destination device 104 to scan or otherwise monitor other communications channels for potentially interfering devices. It should be noted that in alternative embodiments of the placeshifting process 200, instead of or in addition to the source device 102 monitoring the transmission performance, the destination device 104 may monitor the transmission performance, detect interference with the transmission performance that should be mitigated, and initiate the mitigation process 300 by automatically scanning, listening to, or otherwise monitoring other communications channels for potentially interfering devices, in which case, the instructions 504 from the source device 102 may not be present in such embodiments of the placeshifting process 200. Additionally, as described above, in other alternative embodiments of the placeshifting process 200, instead of instructing the destination device 104, the source device 102 may instruct another auxiliary device 106, 108 in the media system 100 whose location is sufficiently close to the destination device 104 to monitor other communications channels and identify potentially interfering devices, thereby allowing the communications interface 105 and/or other resources of the destination device 104 to maintain their current level of allocation to the data transmission 502 from the source device 102.

Referring again to the illustrated embodiment of FIG. 5 with reference to FIGS. 1-4, after receiving the instructions 504 from the source device 102, the destination device 104 monitors 506 the second wireless communications channel 120 and identifies the potentially interfering device 130 communicating thereon (e.g., task 302). In exemplary embodiments, while monitoring 506 the second wireless communications channel 120, the destination device 104 also determines or otherwise obtains the utilization ratio for the interfering device 130 and the signal strength at the location of the destination device 104 for the detected communications from the interfering device 130. Thereafter, the destination device 104 transmits or otherwise provides 508, to the source device 102, indication of the second wireless communications channel 120 that the interfering device 130 is communicating on, the utilization ratio of the interfering device 130, and the interference signal strength at the location of the destination device 104. Based on the utilization ratio and/or the interference signal strength, the source device 102 determines whether attempts should be made to mitigate the impact of the potentially interfering device 130. In other embodiments, the destination device 104 may determine whether attempts should be made to mitigate the impact of the potentially interfering device 130 and then notify the source device 102 accordingly.

In the illustrated embodiment, after determining the interference should be mitigated, the source device 102 communicates 510, 512 with the other auxiliary devices 106, 108 in the media system 100 and performs an identification process 400 to identify a set of potential mitigating devices (e.g., task 306). In this regard, the source device 102 communicates 510 with the first auxiliary device 106 to confirm that the first auxiliary device 106 is not currently utilizing its communications interface 107 or otherwise performing relatively higher priority operations (e.g., task 402) before transmitting or otherwise providing signals or instructions to operate its communications interface 107 on the communications channels 110, 120. The instructions from the source device 102 cause the auxiliary device 106 to determine or otherwise obtain the signal strength between the first auxiliary device 106 and the interfering device 130, the signal strength between the first auxiliary device 106 and the destination device 104, and/or the signal strength between the first auxiliary device 106 and the source device 102 and/or other devices with in the media system 100 that may be communicating data. The auxiliary device 106 transmits or otherwise provides 510 the obtained signal strengths to the source device 102, which, in turn, determines whether to include the first auxiliary device 106 in the set of possible mitigating devices based on those signal strengths (e.g., tasks 406, 410, 412). In a similar manner, the source device 102 communicates 512 with the second auxiliary device 108 to perform or otherwise implement the identification process 400 and determine whether to include the second auxiliary device 108 in the set of possible mitigating devices based on the signal strengths obtained from the second auxiliary device 108.

After determining that both auxiliary devices 106, 108 are potential mitigating devices, the source device 102 may analyze or otherwise compare the signal strengths between the respective auxiliary devices 106, 108 and the destination device 104 and/or the interfering device 130 to identify an initial mitigating device. For example, when the signal strength of the first auxiliary device 106 at the destination device 104 is less than the signal strength of the second auxiliary device 108 at the destination device 104, the source device 102 may identify the first auxiliary device 106 as the initial mitigating device. In an alternative embodiment, the source device 102 may identify the first auxiliary device 106 as the initial mitigating device when the signal strength between the first auxiliary device 106 and the interfering device 130 is greater than the signal strength between the second auxiliary device 108 and the interfering device 130, or based on some other combination of signal strengths between the destination device 104, the interfering device 130, the source device 102 and/or other devices in the media system 100.

After determining the first auxiliary device 106 should be utilized for the initial attempt to mitigate interference, the source device 102 signals or otherwise instructs 514 the first auxiliary device 106 to begin operating on the second wireless communications channel 120 in a manner that is configured to reduce the utilization ratio of the interfering device 130 (e.g., task 308). In this regard, the instructions transmitted by the source device 102 are configured to cause the auxiliary device 106 to operate its communications interface 107 to broadcast or otherwise transmit 516 dummy data over the second wireless communications channel 120. The dummy data may include a sequence of one or more packets which are intended to result in the collision detection schemes implemented by the interfering device 130 detecting or otherwise identifying the presence of the first auxiliary device 106 on the second wireless communications channel 120, which, in turn, results in the interfering device 130 reducing its utilization ratio of the second wireless communications channel 120 to avoid collisions.

As described above in the context of FIG. 3, after instructing 514 the identified mitigating device 106 to begin mitigation operation, the source device 102 may continue transmitting data to the destination device 104 via the first wireless communications channel 110 and monitoring the performance metrics associated with the data transmission to verify or otherwise confirm that the operation of the mitigating device 106 is resulting in a desired level of improvement with respect to the data transmission. In this regard, when the transmission 516 of dummy data by the mitigating device 106 improves the performance metric(s) of the data transmission by at least a desired amount, the mitigating device 106 continually and/or repeatedly transmits 518, 520 the dummy data over the second wireless communications channel 120 until the interference mitigation is no longer desired (e.g., task 314). For example, when the destination device 104 is streaming the data for the selected media program to a display device, the destination device 104 may detect or otherwise determine when the streaming of the selected media program is completed and transmit or otherwise provide a notification 522 to the source device 102 that the interference mitigation is no longer desired. The destination device 104 may also notify 522 the source device 102 when a user manipulates or otherwise interacts with the destination device 104 to stop presentation of the streaming media program (e.g., by changing the channel or selecting another media program, powering off the display device and/or the destination device 104, or the like). As described above in the context of FIG. 3, in some embodiments, in lieu of receiving the notification 522, the source device 102 may monitor the performance of the data transmission to the destination device 104 and determine that the interference mitigation is no longer desired based on improvements in the data transmission performance relative to the remaining duration of the media program. Similarly, the destination device 104 may monitor the performance of the data transmission and provide the notification 522 in response to determining that the interference mitigation is no longer desired based on improvements in the data transmission performance.

In the illustrated embodiment of FIG. 5, in response to determining the interference mitigation is no longer desired, the source device 102 may automatically transmit or otherwise provide 524 a corresponding notification to the mitigating device 106 to cease transmitting data over the second wireless communications channel 120. In this manner, the interfering device 130 is allowed to revert to its previous utilization ratio when the interference mitigation is no longer desired. As described above in the context of FIG. 3, in some embodiments, the initial instructions 514 transmitted by the source device 102 to the mitigating device 106 may be configured to cause the mitigating device 106 to only transmit 516, 518, 520 the dummy data for the remaining duration of a media program being streamed to the destination device 104. In such embodiments, the mitigating device 106 may automatically cease transmitting dummy data once an amount of time equal to the remaining duration of the media program has elapsed without relying on the notifications 522, 524 to cease transmission of the dummy data.

Figure 6:
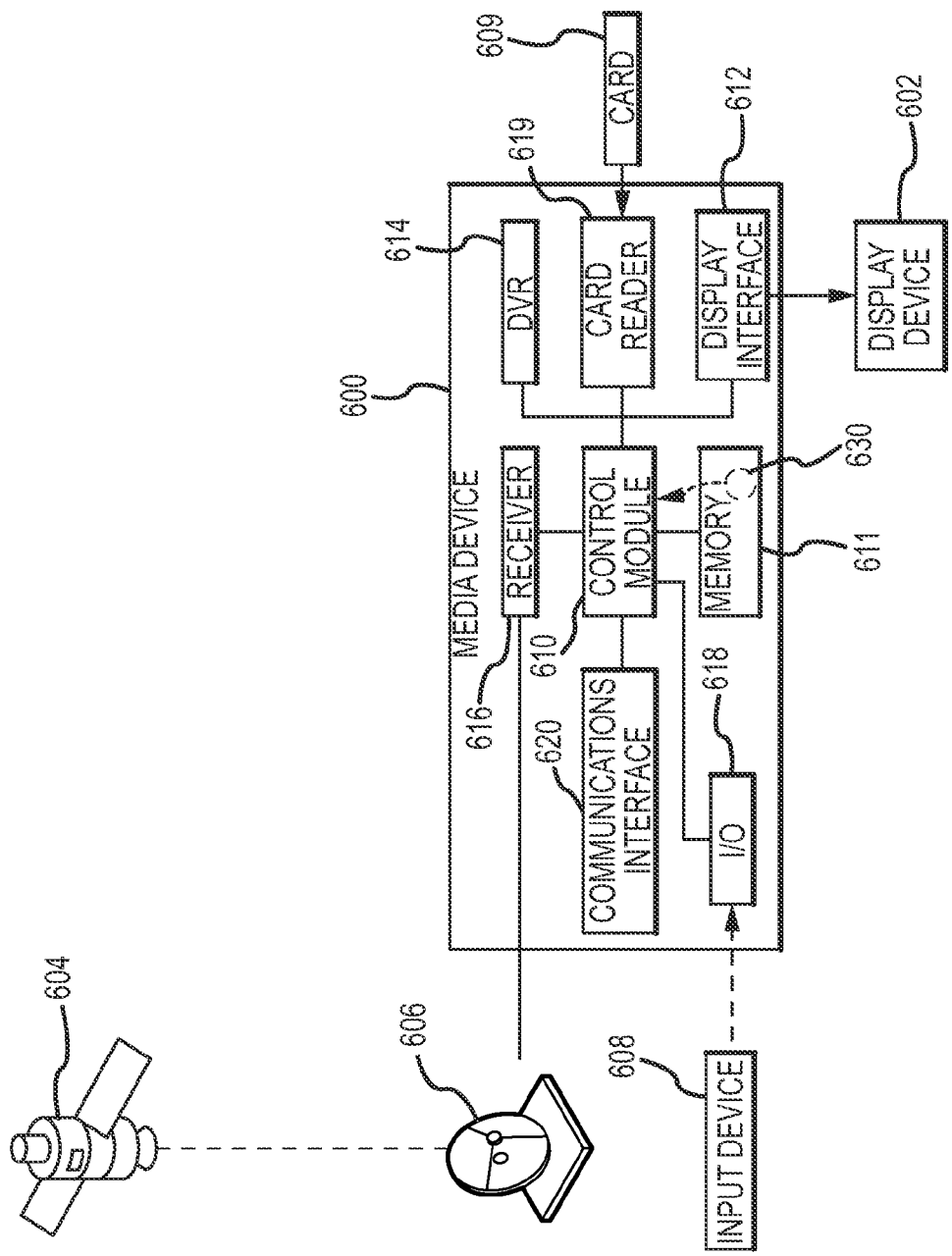
FIG. 6 is a block diagram of an exemplary media device suitable for use in the media system of FIG. 1 in accordance with one or more embodiments.

FIG. 6 depicts an exemplary embodiment of a media device 600 suitable for use as one or more of the devices 102, 104, 106, 108 in the media system 100. For example, referring to FIG. 1, in accordance with one or more embodiments, the media system 100 comprises a network of communicatively coupled media devices 102, 104, 106, 108, where each device 102, 104, 106, 108 is be realized as a separate instance of the media device 600. In exemplary embodiments, at least the source device 102 is realized as the media device 600. In this regard, in some embodiments, the source device 102 may be the only instance of the media device 600 that is capable of receiving media programs from an external content source. For example, the other instances of the media device 600 within the media system 100 may not include or otherwise be coupled to an access card 609, an antenna 606, and/or a receiver interface 632, such that those instances receive media programs from external sources via the source media device 102, 600 by performing the placeshifting process 200 described above. Thus, the mitigation process 300 of FIG. 3 may be performed to mitigate interference while one instance of the media device 600 within the media system 100 is receiving a broadcast media program from the broadcast content source 604 by way of the source media device 102, 600 streaming the data for that broadcast media program from the broadcast content source 604 to that destination media device 104, 600 over a first wireless communications channel 110.

Referring to FIG. 6, in exemplary embodiments, the media device 600 generally represents any component, hardware or the like capable of receiving and processing media content and providing media content to a display device 602 for presentation by or on the display device 602. Depending on the embodiment, the display device 602 may be realized as a television, monitor, liquid crystal display (LCD), light emitting diode (LED) display, plasma display, or the like that graphically presents, renders, or otherwise displays imagery and/or video corresponding to media content provided by the media device 600. In some embodiments, media device 600 is a set-top box (STB) or similar system that is able to receive television programming and/or to record certain media programs. Exemplary embodiments of media device 600 will therefore include a receiver interface 616 for receiving satellite, cable and/or broadcast programming signals from broadcast content sources 604, as well as a data storage element 614 (e.g., a hard disk, flash memory, or another suitable non-volatile non-transitory data storage element) to support a digital video recorder (DVR) feature and/or functionality, a display interface 612 for providing imagery and/or video corresponding to a media program to the primary display device 602, one or more input elements (e.g., an input/output interface 618 to a remote control or other user input device 608) for receiving user inputs to media device 600, and a control module 610 that directs, manages, or otherwise controls the operations of the media device 600 as appropriate. For convenience, but without limitation, the data storage medium 614 is alternatively referred to herein as a DVR. In some embodiments, the media device 600 may also include an access card interface or card reader 638 adapted to receive an access card 609 (or viewing card) configured to ensure that the viewer is authorized to view media content provided to the display device 602. In this regard, the access card 609 may include includes unique identification information associated with a particular subscriber to the broadcast content source 604 or otherwise include information that facilitates receiving and/or decoding media content provided by the broadcast content source 604.

The communications interface 620 generally represents the component, hardware or the like of the media device 600 that facilitates communications with the other devices, such as other instances of the media device 600 (e.g., a destination media device 104) via a wireless communications channel (e.g., first wireless communications channel 110). Accordingly, depending on the embodiment, the communications interface 620 may include or otherwise be realized as one or more of an IEEE 802.11 wireless transceiver (e.g., "WiFi"), a Bluetooth transceiver, a cellular transceiver, a wired network interface controller (e.g., Ethernet), or the like. That said, in exemplary embodiments described herein, the communications interface 620 includes or is otherwise realized as a wireless network adapter that facilitates communications with other devices within a vicinity of the media device 600. It should be noted that the communications interface 620 may operate on one frequency band (e.g., the 2.4 GHz carrier frequency band) while the I/O interface 618 operates at a lower frequency, such as, for example, consumer infrared (e.g., carrier frequency in the range of about 30 kHz to about 60 kHz).

It should be appreciated that FIG. 6 depicts merely one exemplary embodiment of a media device 600, and in practice, the media device 600 may be physically and/or logically implemented in any manner to suit the needs of a particular embodiment. In this regard, in some embodiments, the components in media device 600 may be provided within a common chassis or housing as illustrated in FIG. 6, although equivalent embodiments may implement media device 600 with any number of inter-connected but discrete components or systems. For example, in some embodiments, the media device 600 may be realized as a combination of a STB and a placeshifting device, wherein some features of the media device 600 (e.g., the DVR 614, the receiver 616, the display interface 612, and/or I/O interface 618) are implemented by the STB and other features of the media device 600 (e.g., the communications interface 620) are implemented by the placeshifting device, wherein the placeshifting device works in conjunction with the STB to shift the viewing experience from the display device 602 associated with the source media device 102, 600 to another instance of a display device 602 associated with a destination media device 104, 600 via a wireless communications channel 110. Examples of placeshifting devices that may be used in some embodiments of media device 600 could include any of the various SLINGBOX products available from Sling Media of Foster City, Calif., although other products or services could be used in other embodiments. Many different types of placeshifting devices are generally capable of receiving media content from an external source, such as any sort of DVR or STB, cable or satellite programming source, DVD player, content servers, and/or the like. In other embodiments, placeshifting features are incorporated within the same device that provides content-receiving or other capabilities. Media device 600 may be a hybrid DVR and/or receiver, for example, that also provides transcoding and placeshifting features. Examples of conventional placeshifting functions, features, systems and structures are described in United States Patent Publication No. 2006/0095471, although the features described herein could be equivalently applied with any number of other techniques and structures in addition to those described in that particular publication.

Still referring to FIG. 6, in the illustrated embodiment, media device 600 is capable of receiving digital broadcast satellite (DBS) signals transmitted from a broadcast source 604, such as a satellite, using an antenna 606 that provides received signals to the receiver 616. Equivalent embodiments, however, could receive programming at receiver 616 from any sort of cable connection, broadcast source, removable media, network service, external device and/or the like. The DVR 614 feature stores recorded programming (e.g., broadcast programming received via receiver 616) on a hard disk drive, memory, or other storage medium as appropriate in response to user/viewer programming instructions, wherein the recorded programming may be subsequently viewed on the display device 602 or placeshifted to another device (e.g., destination media device 104, 600). Content stored in DVR 614 may be any sort of file-based programming or other content that is accessible to media device 600. Additionally, media content in DVR 614 may be stored in any sort of compressed or uncompressed format, as desired, and may be encoded or transcoded as desired for effective receipt, storage, retrieval and playing.

Control module 610 may be realized as any suitable combination of hardware, firmware, and/or other components of the media device 600 capable of directing, managing or otherwise controlling the operations of media device 600 and supporting one or more of the processes 200, 300, 400 described above in the context of FIGS. 1-5. The control module 610 may include one or more processing systems and/or devices, such as, for example, one or more processors, central processing units (CPUs), graphics processing units (GPUs), controllers, microprocessors, microcontrollers, processing cores and/or other computing resources. The media device 600 includes a data storage element (or memory) 611 that is coupled to or otherwise accessed by the control module 610 and stores programming instructions that, when read and executed, cause the control module 610 to create, generate, or otherwise facilitate a placeshifting application 630 that controls operations of the media device 600 and supports the processes 200, 300, 400 described above in the context of FIGS. 1-5 or otherwise performs various tasks, functions, processes and/or operations described herein. The memory 611 may be realized using as random access memory (RAM), read only memory (ROM), flash memory, magnetic or optical mass storage, or any other suitable configuration of non-transitory short or long term data storage or other non-transitory computer-readable media capable of storing programming instructions for execution by the control module 610. In some embodiments, the control module 610 is implemented as a "system on a chip" (SoC) that incorporates a hybrid microcontroller with memory, input/output and other features to perform the various signal processing and other actions of media device 600, and in which case a separate memory 611 may not be provided.

Figure 7:
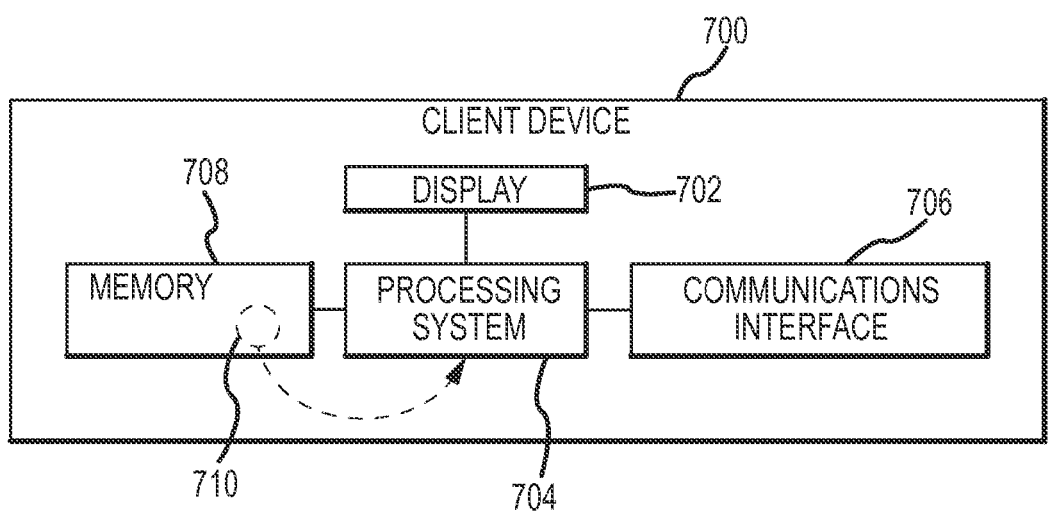
FIG. 7 is a block diagram of an exemplary client device suitable for use in the media system of FIG. 1 in accordance with one or more embodiments.

FIG. 7 depicts an exemplary embodiment of a client device 700 suitable for use as one or more of the devices 102, 104, 106, 108 in the media system 100. For example, in some embodiments, one or more of the devices 102, 104, 106, 108 may be realized as a separate instance of the client device 700. The client device 700 generally represents any sort of electronic device capable of transmitting and/or receiving data over the communications channels 110, 120. Additionally, exemplary embodiments of the client device 700 are capable of playing or otherwise presenting media content, such as, for example, a streaming media program corresponding to placeshifted data received from a source device 102 in the media system 100. In this regard, depending on the embodiment, the client device 700 may be realized as a mobile telephone, a laptop or notebook computer, a tablet computer, a desktop computer, a personal digital assistant, a video game player, a portable media player and/or any other media playback device capable of rendering media content received via the wireless communications channel 110.

In exemplary embodiments, the client device 700 includes or otherwise executes an application 710 configured to support the processes or operations described above in the context of FIGS. 1-6. For example, when the source device 102 or the destination device 104 is realized as an instance of the client device 700, the client device 700 may execute or otherwise generate a placeshifting application 710 configured to establish a peer-to-peer communication session over the first wireless communications channel 110 with a corresponding placeshifting application on the other device 102, 104 and support the placeshifting process 200 of FIG. 2 in conjunction with the mitigation process 300 of FIG. 3. In the case of a destination client device 104, 700, the placeshifting application 710 may also decode the media content data stream received from a source device 102 and present the media program on the display 702 associated with the client device 700, or alternatively, store the media program on the client device 700 for subsequent presentation on the display 702. In a similar manner, when an auxiliary device 106, 108 is realized as an instance of the client device 700, the client device 700 may execute or otherwise generate an interference mitigation application 710 configured to support the mitigation process 300 and/or the mitigating device identification process 400 described above.

As illustrated in FIG. 7, the client device 700 includes a processing system 704 that is coupled to the display 702 and a communications interface 706, wherein the processing system 704 is configured to execute or otherwise support the application 710 and the additional processes, tasks, functions, and/or operations described herein. The display 702 generally represents the component, hardware or the like of the client device 700 that is capable of displaying, rendering, or otherwise presenting media content and/or other imagery that is received by or otherwise stored on the client device 700. In this regard, the display 702 may be realized as a monitor, screen, or another conventional electronic display device capable of graphically presenting media content and/or other imagery.

The processing system 704 may be realized using any suitable processing system and/or devices, such as, for example, one or more processors, central processing units (CPUs), graphics processing units (GPUs), controllers, microprocessors, microcontrollers, processing cores and/or other computing resources configured to support the subject matter described herein. In exemplary embodiments, the client device 700 includes a data storage element (or memory) 708 that is coupled to or otherwise accessed by the processing system 704. The memory 708 may be realized using as random access memory (RAM), read only memory (ROM), flash memory, magnetic or optical mass storage, or any other suitable configuration of non-transitory short or long term data storage or other non-transitory computer-readable media capable of storing programming instructions for execution by the processing system 704. The stored programming instructions, when read and executed by the processing system 704, cause processing system 704 to create, generate, or otherwise facilitate the application 710.

The communications interface 706 generally represents the component, hardware or the like of the client device 700 that facilitates communications with other devices within the media system 100. For example, in one or more embodiments, the devices 102, 104, 106, 108 in the media system 100 communicate over a wireless local area network (WLAN) (e.g., in accordance with one or more of the IEEE 802.11 standards) that supports the transmission control protocol and/or internet protocol (TCP/IP) or other conventional protocols, in which case the communications interface 706 is realized as a wireless adapter, a wireless transceiver, a wireless network interface controller, or the like. In alternative embodiments, the communications interface 706 may include or otherwise be realized as a Bluetooth transceiver, a cellular transceiver, a wired network interface controller (e.g., Ethernet), or the like.

To briefly summarize, by virtue of the subject matter described herein, a media program or other data may be reliably streamed or otherwise placeshifted from a source device to a destination device via a wireless communications channel while other potentially interfering devices are operating on one or more adjacent and/or overlapping wireless communications channels by operating one or other devices in a media system to reduce the frequency and/or amount of communications by those potentially interfering devices. Thus, the user experience at the destination device is improved by reducing the likelihood of buffering, packet and/or data loss, and other performance impairments that could otherwise be attributable to interference on adjacent and/or overlapping wireless communications channels. Additionally, the interference mitigation is implemented in a manner that reduces the likelihood of undesirably impacting the user experience for other devices in the media system while also limiting the duration of the interference mitigation, which, in turn, limits its impact on the interfering devices.

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method of transmitting data from a source device to a destination device over a first communications channel, the method comprising:
    monitoring a frequency band for interference when a performance metric associated with transmission of the data from the source device to the destination device is indicative of impairment of the transmission, the frequency band including a first communications channel and a second communications channel;
    identifying interference with the transmission of the data from the source device to the destination device while monitoring the frequency band, the interference comprising communications on a second communications channel different from the first communications channel; and
    after identifying the interference, initiating operation of a third device to transmit data on the second communications channel after determining a first signal strength of the third device at the destination device is less than a second signal strength associated with the communications, wherein the operation of the third device is configured to decrease a utilization ratio associated with the communications on the second communications channel.

2. A non-transitory computer-readable medium having computer-executable instructions stored thereon that, when executed by a processing system, cause the processing system to perform the method of claim 1.

3. The method of claim 1, at least one of the source device and the destination device being communicatively coupled to the third device, wherein initiating operation of the third device comprises the at least one of the source device and the destination device signaling the third device to transmit the data on the second communications channel.

4. A method of transmitting data from a source device to a destination device over a first communications channel, the method comprising:
    identifying interference with transmission of the data from the source device to the destination device, the interference comprising communications on a second communications channel different from the first communications channel;
    identifying a third device from among a plurality of possible mitigating devices based on a signal strength between the third device and the destination device; and
    initiating operation of the third device to transmit data on the second communications channel after identifying the interference, wherein the operation of the third device is configured to decrease a utilization ratio associated with the communications on the second communications channel.

5. The method of claim 4, further comprising monitoring a frequency band for the interference when a performance metric associated with the transmission of the data is indicative of impairment of the transmission, the frequency band including the first communications channel and the second communications channel, wherein identifying the interference comprises identifying the communications on the second communications channel while monitoring the frequency band.

6. The method of claim 5, wherein initiating the operation of the third device comprises initiating the operation of the third device based at least in part on one or more interference metrics associated with the communications.

7. The method of claim 6, wherein initiating the operation of the third device based at least in part on the one or more interference metrics comprises initiating the operation of the third device in response to determining the utilization ratio associated with the communications is greater than a threshold value.

8. The method of claim 6, wherein initiating the operation of the third device based at least in part on the one or more interference metrics comprises initiating the operation of the third device in response to determining a signal strength associated with the communications is greater than a threshold value.

9. The method of claim 4, wherein identifying the interference comprises the destination device determining a performance metric associated with the transmission of the data is indicative of impairment of the transmission.

10. The method of claim 4, wherein identifying the interference comprises the source device determining a performance metric associated with the transmission of the data is indicative of impairment of the transmission.

11. The method of claim 10, further comprising the source device instructing the destination device to monitor a frequency band for the interference when the performance metric associated with the transmission of the data is indicative of impairment of the transmission, wherein initiating operation of the third device comprises the source device instructing the third device to perform the operation on the second communications channel within the frequency band when the destination device identifies the communications on the second communications channel while monitoring the frequency band.

12. The method of claim 4, wherein identifying the third device comprises identifying the third device when the signal strength is less than a second signal strength associated with the interference at the destination device.

13. A media system comprising:
a destination device to receive first data from a source device via a first communications channel; and
an auxiliary device communicatively coupled to at least one of the destination device or the source device to transmit second data over a second communications channel different from the first communications channel after the at least one of the destination device or the source device identifies interference with the destination device receiving the first data, the interference comprising communications on the second communications channel, the second data being configured to decrease a utilization ratio associated with the communications on the second communications channel, wherein:
the destination device is configured to monitor a frequency band including the first communications channel when a performance metric associated with receiving the first data is indicative of the interference and detect the communications on the second communications channel within the frequency band; and
after determining a first signal strength of the auxiliary device at the destination device is less than a second signal strength associated with the communications, the source device or the destination device instructs the auxiliary device to transmit the second data after the destination device detects the communications on the second communications channel.

14. The media system of claim 13, wherein:
the first communications channel comprises a first wireless communications channel; and
the second communications channel comprises a second wireless communications channel.

15. The media system of claim 14, wherein:
the source device comprises a first set-top box; and
the destination device comprises a second set-top box.

16. A method comprising:
transmitting data from a source device to a destination device via a first wireless communications channel;
identifying interference with the transmitting of the data based at least in part on one or more performance metrics associated with the transmitting of the data;
detecting communications on a second wireless communications channel after identifying the interference, the second wireless communications channel being different from the first wireless communications channel;
identifying a third device from among a plurality of possible mitigating devices based on a first signal strength of the third device at the destination device being less than a second signal strength associated with the communications at the destination device; and
initiating operation of the third device to transmit data on the second wireless communications channel after detecting the communications, the third device being communicatively coupled to at least one of the source device and the destination device, wherein the operation of the third device on the second wireless communications channel is configured to decrease a utilization ratio associated with the communications on the second wireless communications channel.

17. The method of claim 16, further comprising determining the utilization ratio associated with the communications on the second wireless communications channel is greater than a threshold value prior to initiating the operation.

* * * * *